Nov. 24, 1942. F. G. DA ROZA ET AL 2,302,748
GANG SPOT WELDER
Filed May 4, 1939 9 Sheets-Sheet 2

INVENTOR.
FRANCIS G. DA ROZA
ROBERT SCHIFF.
BY Barnes, Kisselle, Laughlin & Raisch
ATTORNEYS

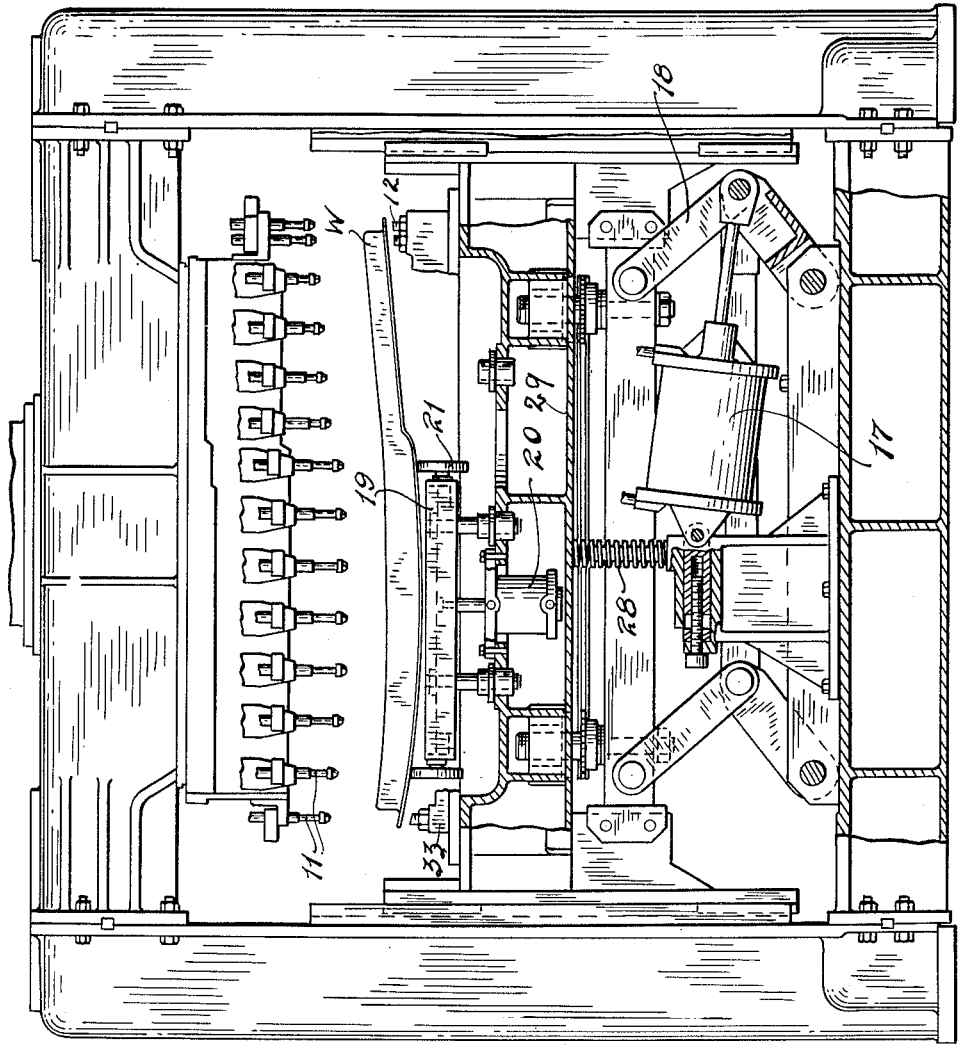

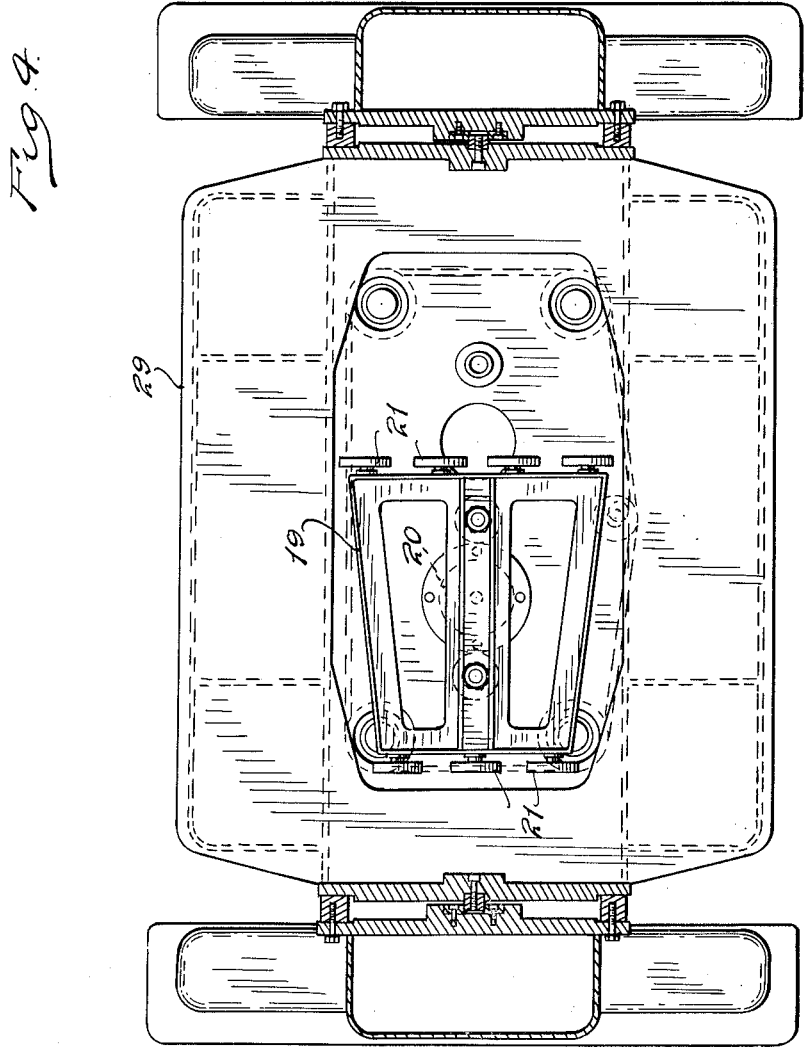

Nov. 24, 1942.  F. G. DA ROZA ET AL  2,302,748
GANG SPOT WELDER
Filed May 4, 1939  9 Sheets-Sheet 6

INVENTOR.
FRANCIS G. DA ROZA
ROBERT SCHIFF
BY
ATTORNEYS.

Nov. 24, 1942.  F. G. DA ROZA ET AL  2,302,748
GANG SPOT WELDER
Filed May 4, 1939      9 Sheets-Sheet 7

INVENTOR.
FRANCIS G. DA ROZA.
ROBERT SCHIFF.
BY Barnes, Kisselle, Laughlin & Raisch
ATTORNEYS.

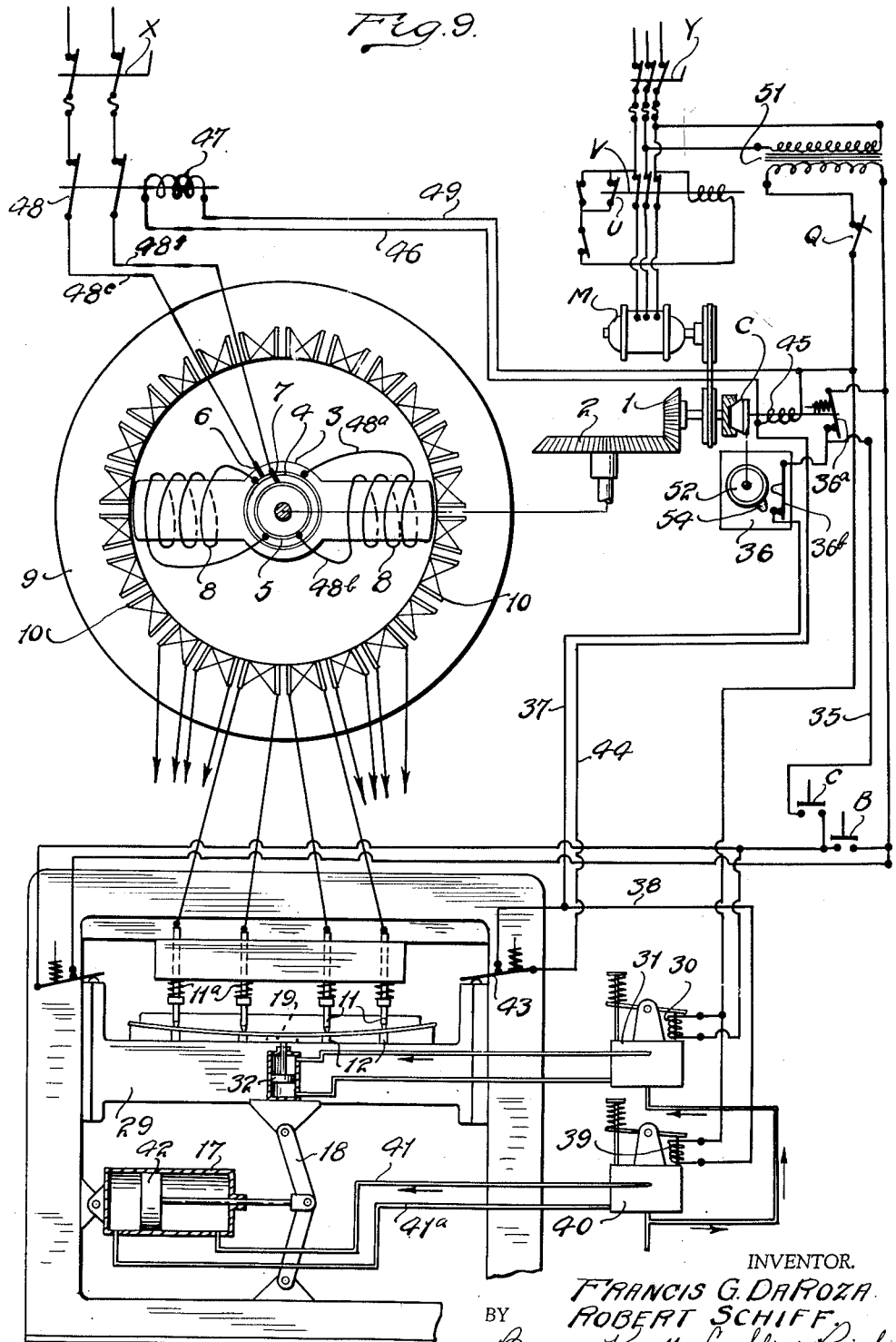

Nov. 24, 1942.  F. G. DA ROZA ET AL  2,302,748
GANG SPOT WELDER
Filed May 4, 1939  9 Sheets-Sheet 9
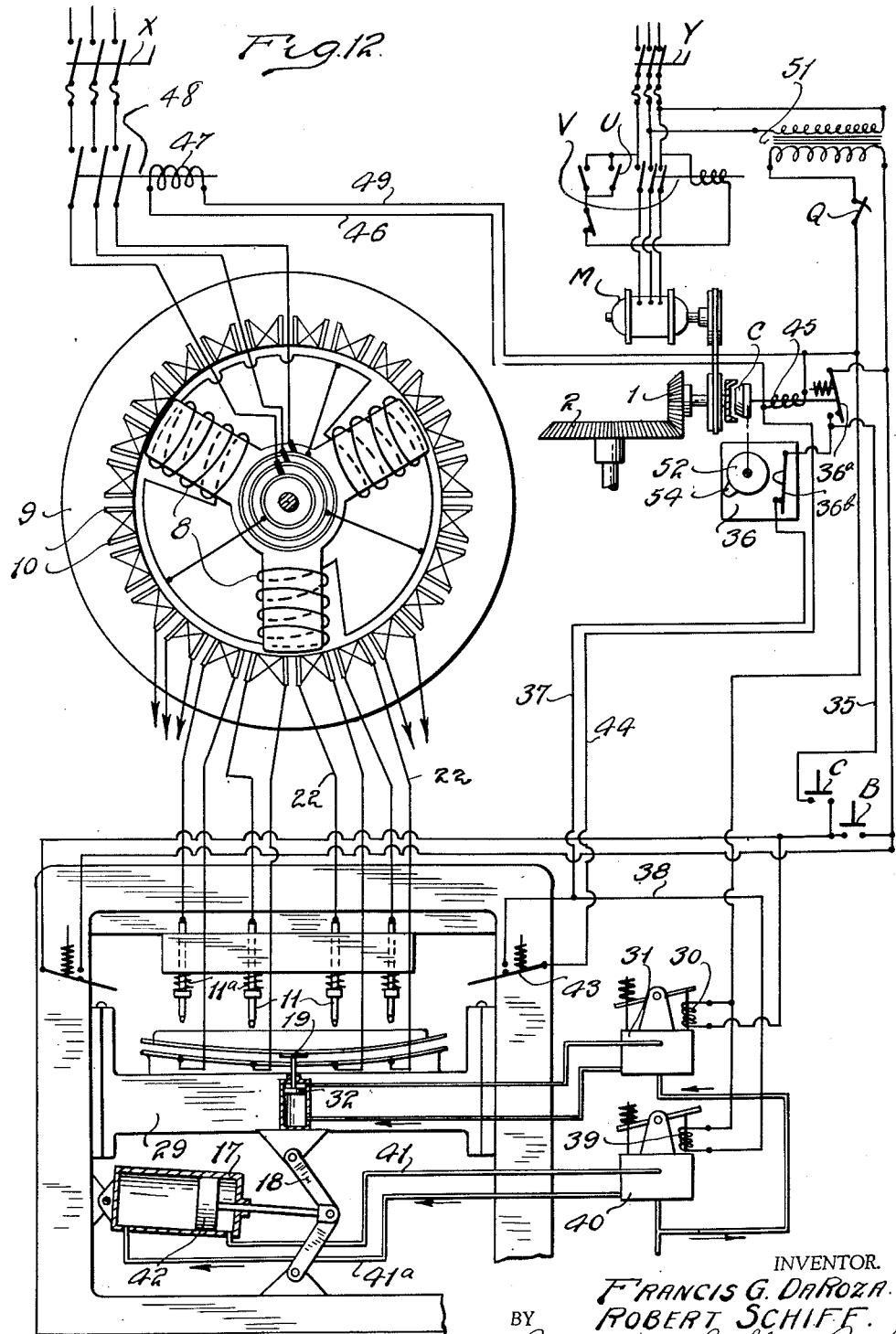
INVENTOR.
FRANCIS G. DaROZA
ROBERT SCHIFF
BY Barnes, Kisselle Laughlin & Raisch
ATTORNEYS Patented Nov. 24, 1942

2,302,748

UNITED STATES PATENT OFFICE 2,302,748

GANG SPOT WELDER

Francis G. da Roza, Ferndale, and Robert Schiff, Detroit, Mich., assignors to General Motors Corporation, Detroit, Mich., a corporation of Delaware Application May 4, 1939, Serial No. 271,628

12 Claims. (Cl. 219—4)

This invention relates to multiple spot welders energized successively by an impulse generator. Multiple spot welders, also called gang spot welders, are adapted to weld a plurality of spots on a single piece of work. They have been used particularly in connection with welding automobile floor pans, door panels, and other panels where a number of spot welds are grouped together. Gang spot welders are not new and have been used extensively in the automobile industry.

Gang spot welders may be grouped into three distinct types: (I) those gang welders employing a plurality of electrodes on a single piece of work, all electrodes making contact to the work at the instant, and all energized at once by a welding transformer having a plurality of secondary coils; (II) those gang welders employing a plurality of electrodes making contact successively on a single piece of work, and each electrode energized successively. Several combinations of types I and II have been accomplished with more or less relative success. (III) The multiple type, or gang spot welder, may consist of a plurality of electrodes making contact at the same instant on a single piece of work, and each electrode being energized successively by one welding transformer consisting of a primary and secondary, and a commutating device or switch mechanism to transfer the secondary current of high amperage to each electrode successively. The first welding machines of this type, employed a switching mechanism which transferred the secondary current from segment to segment, each individual segment being connected to a separate electrode. The process of transferring the secondary current produced harmful arcing and pitting of the contacts and the segments. An improvement was gained when the current was switched off before moving to the next segment. The primary current was switched off by a mechanical switch or by an arc-discharge gaseous tube.

Referring to the two types of multiple spot welders, type I has the distinct disadvantage of requiring a relatively large welding transformer, since it must supply welding energy to a plurality of electrodes at the same instant. The primary current of this transformer is very large, necessitating expensive power feeders and substations, and the transformer produces large fluctuations in the power demand and momentarily high voltage drops in the feeder system. Type II, multiple spot welders, cause excessive pounding of the electrodes, require delicate mechanical, pneumatic or hydraulic systems to bring the electrodes into position successively. Type III, gang spot welders, are economical of primary current, but employ switching mechanisms that are delicate to control, and require excessive maintenance to keep in operating condition.

We have invented a fourth type of multiple or gang spot welders. Our invention pertains to a gang spot welder requiring low primary current, and, therefore, devoid of the disadvantage of the type I, gang welders. Our invention does not have complicated hydraulic or pneumatic cylinders to operate the welding electrodes successively as required by the type II, gang spot welders, and, therefore, requiring less pounding and mechanical wear of the electrodes. Our invention pertains to a distributor of secondary current of high amperage without the necessity of contacts, segments, or complicated switching mechanisms. Our invention pertains to a welding transformer which is at the same time a distributor. It has none of the disadvantages of the former types of gang welders, and has all their advantages, besides being a much simpler piece of equipment combining long life and ease of maintenance.

Referring to the drawings:

Fig. 3 is a side view of the machine showing the operating toggles at the bottom of the stroke, the press open, and an automobile door panel before or after it has been welded, and ejected by the ejecting mechanism.

Fig. 4 is a plan view of the work platform or table taken on the line 4—4 of Fig. 1.

Fig. 9 is a diagrammatic view of the apparatus, showing a single-phase impulse generator at the instant when the press is closed, and welding current is passing through the electrodes.

Fig. 12 is a diagrammatic view of the apparatus showing a three-phase impulse generator at the instant when the press is open, and the door panel has just been inserted preparatory to welding, and the rotor is stationary.

Figure 5:
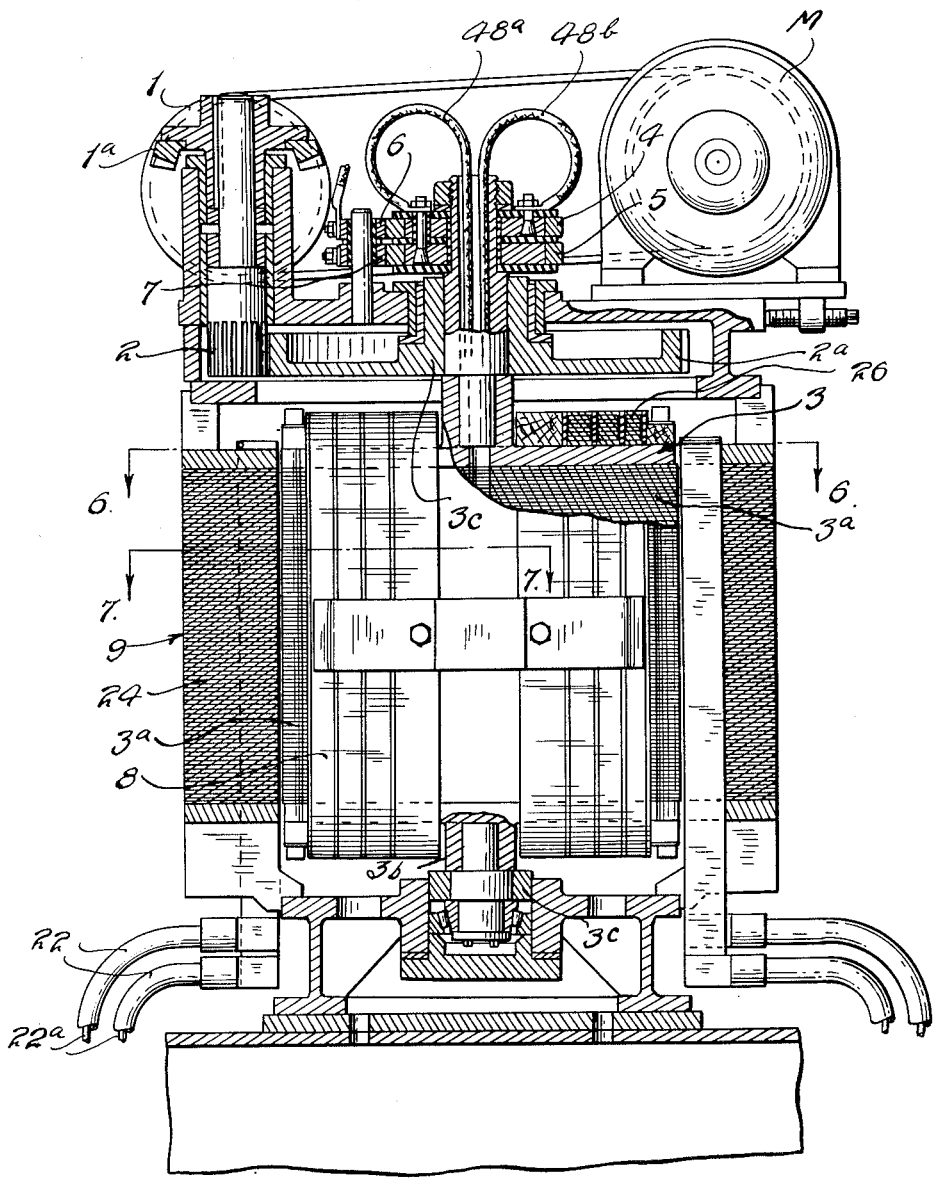
Fig. 5 is a vertical cross section of a single-phase impulse generator showing the rotor in elevation and partly in section, the stator, the brush rig mechanism, the reduction gear and drive, the secondary coils and cables.
Figure 7:
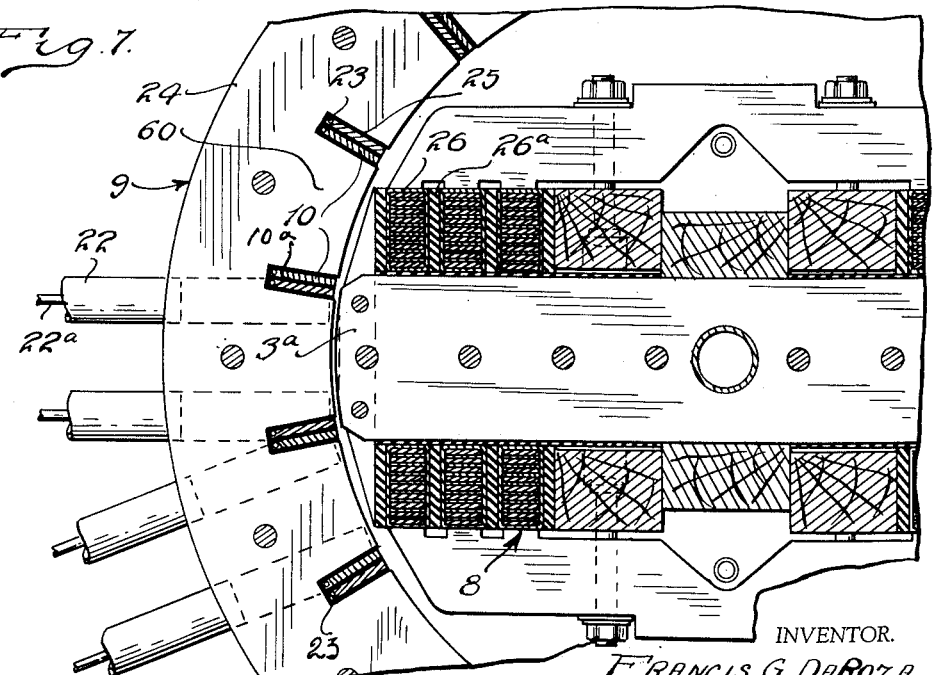
Fig. 7 is a fragmentary section of the line 7—7 of Fig. 5.

Referring first to Fig. 5 and Fig. 7: the general construction of the single-phase impulse generator may be seen. The impulse generator consists of a rotor 3 and a stator 9. The ratio of height to diameter of the unit is governed by the relative number of secondary coils, the output voltage required, etc. All these factors are appreciated and readily determined by persons versed in the art of transformer design and construction.

The rotor 3 consists of a laminated iron core 3a secured to a vertical shaft 3b and supported on two bearings 3c. A primary winding 8 consists of several layers of coils 26 adequately insulated from each other by the insulation 26a. This winding 8 is wound around the core 3a. The coil windings 8 are connected so that the current flowing in each and every coil 26 produces a cumulative magnetomotive force. Any series-parallel combination of the coils may be used provided the applied electromotive force or applied voltage is of such a value that the iron of the stator core does not become saturated. These factors are well understood by persons versed in the design of electrical machinery.

Figure 8:
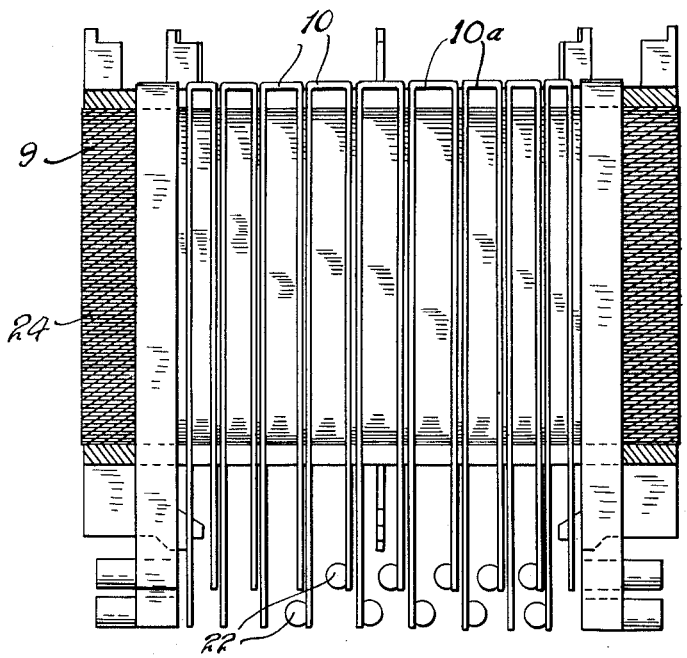
Fig. 8 is a detailed section of the stator with the rotor removed.

The stator 9 consists of a laminated iron core and a group of secondary coils 10. This stator is designed for twenty-four secondary coils, although stators of less number or greater number of coils can be constructed. The stator core consists of twenty-four slots and teeth equally spaced, circumferentially, around the inner diameter of the core; the slots and teeth are cut vertically, parallel to each other, as shown on Fig. 8. Each slot contains two parallel copper conductors, one conductor for each of the two adjacent secondary coils. These two conductors 10 are insulated from each other, and from the stator core 9a by the insulation 10a.

Figure 10:
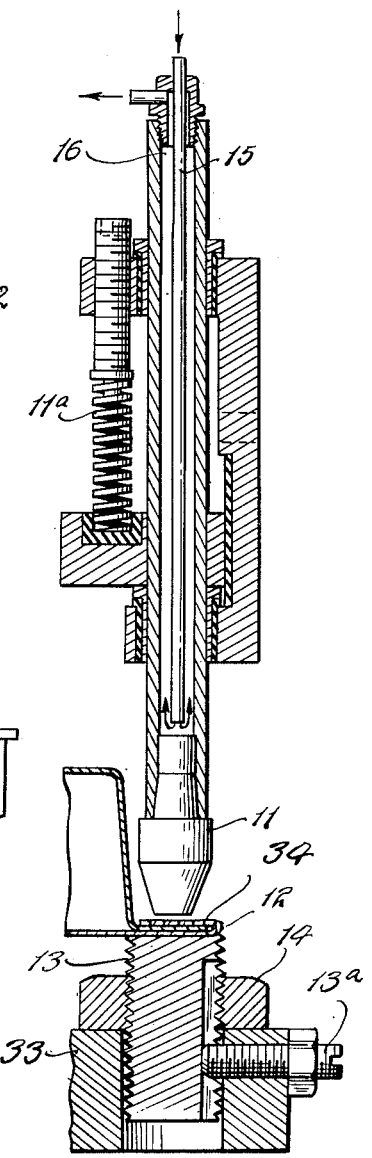
Fig. 10 is a vertical section through one of the electrodes, its yielding support, and the heat-dissipating pad.

Each secondary coil 10 is water cooled by a stream of water flowing through a small tube 23 inserted through the edge of the conductor. The tube is located at the bottom of the slot to help cool the laminated iron core. The secondary coil containing the cooling tube is wound around the tooth. The secondary coil ends are connected to cables 22 water cooled by flexible metal tubing 22a. The electrodes 11 are also water cooled, as shown in Fig. 10. Although water cooling is not necessary to the operation of the impulse generator, its use greatly increases the thermal capacity of the machine and permits a more frequent operation of the gang welder without serious overheating.

The rotor 3 is rotated through gear train 1, 1a, 2 and 2a. The gear 1 is attached to a pulley which is rotated by the motor M. The rotor shaft 3b is hollow to permit two primary feeder cables, 48a and 48b, connected to the slip rings 4 and 5, to be brought in to the rotor windings 8.

Referring to Fig. 5: The slip rings make contact to two segmented rings which serve as the brushes 6 and 7. Referring to Fig. 9: These segmented rings or brushes are energized by the primary feeder leads 48e and 48f, which are connected to the load side of the magnetic contactor 48.

Figure 2:
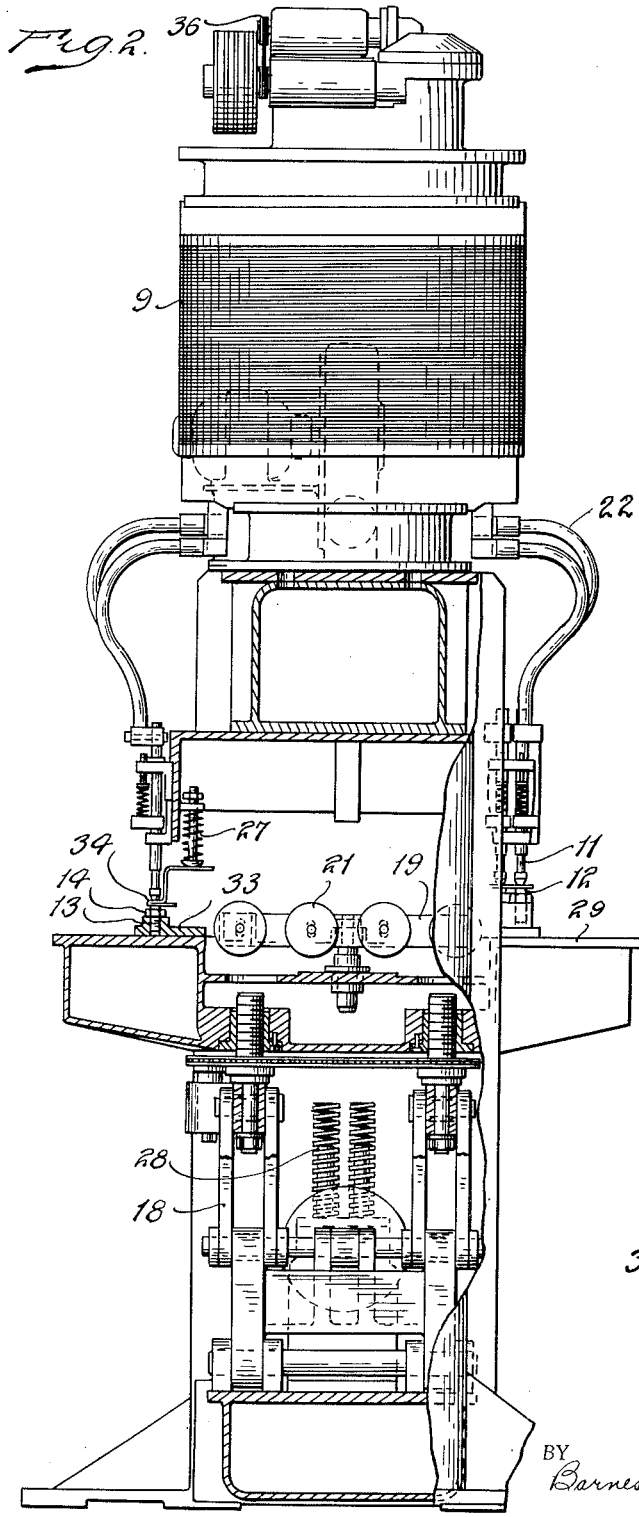
Fig. 2 is an end elevation of the machine broken away to show the end view of the operating toggles.

Referring to Fig. 2: The timer mechanism 36 is mounted on top of the reduction gear housing. The pulleys and the belt connecting the timer to the drive may be seen. Referring to Fig. 9: The timer mechanism 36 consists of a solenoid 45, a clutch C, a timing cam 52 and its nub 54, a normally open contact 36a and a normally closed contact 36b.

Figure 1:
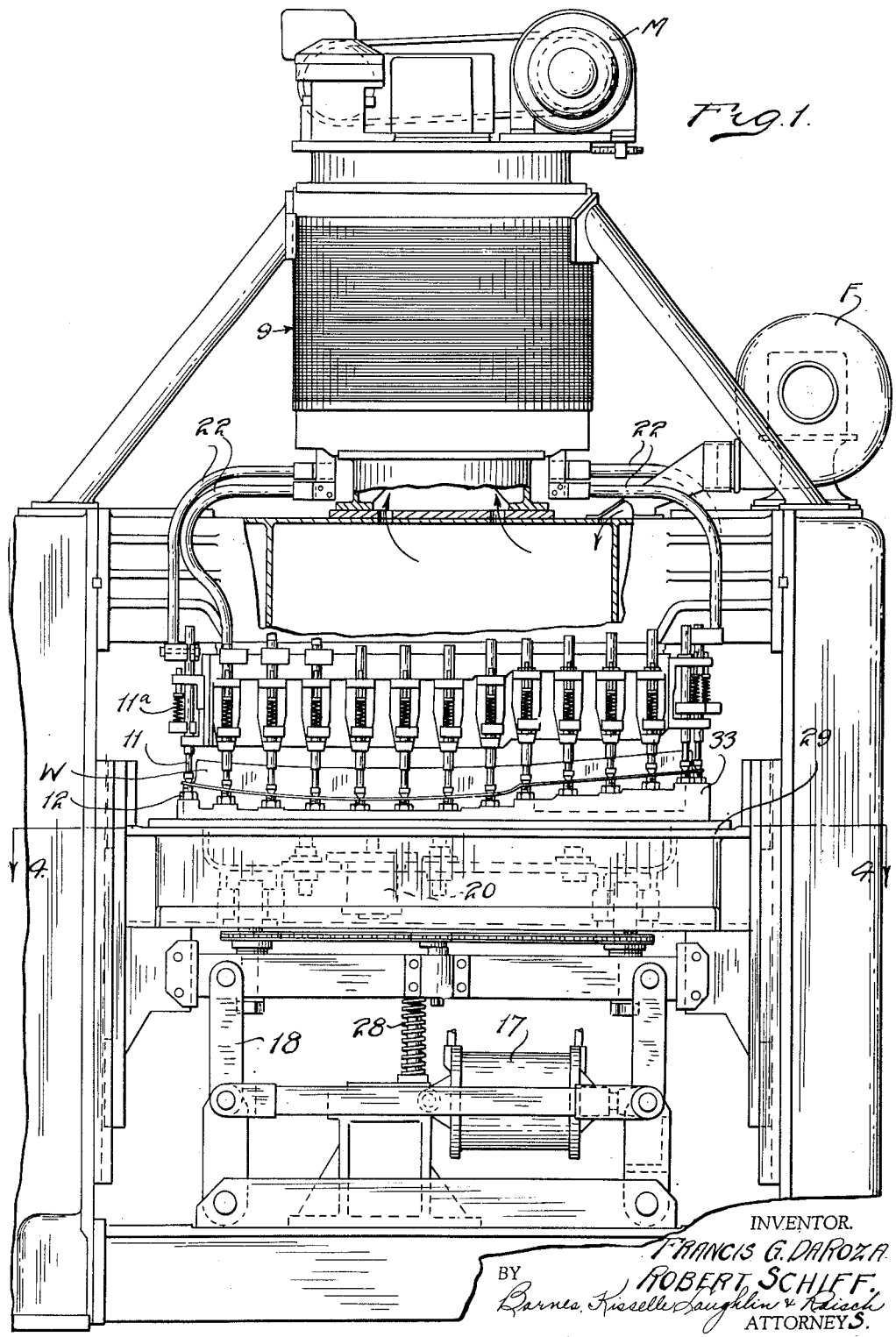
Fig. 1 is a side elevation of the machine which includes the impulse generator, the welding electrodes and the press mechanism.

Referring to Figs. 1, 2, and 3: There will be seen the electrodes 11, the electrode pads 12, the ejector mechanism 19 operated by the fluid cylinder 20, the table 29 operated by the toggles 18 and fluid cylinder 17, and the shock-absorbing springs 28.

Referring to Fig. 1: This shows the table 29 carrying the door panel, or work W, and pressing it against the electrodes 11 connected to cables 22. The toggles 18 have been pulled straight by the piston in the fluid cylinder 17. The upper head of the press is shown partly in cross section. The arrows indicate the air flow to the rotor from the centrifugal fan F.

Referring to Fig. 2: This shows the timer 36, the electrodes 11 making contact to the door overlap flange 34, backed up by the copper pads 12. These copper pads are provided under each electrode, and these are adjustable vertically (Fig. 10) by means of being screw threaded as at 13, and by reason also of the jamb nut 14 as shown in Fig. 10. The door is fitted over the jig 33, shown in Fig. 4, which serves to hold the work parts in their proper position.

Referring to Fig. 3: This shows the toggles 18 at an angle positioned by the fluid cylinder 17. The table 29 has been lowered compressing springs 28. The ejector mechanism 19 is shown raised by the piston in the fluid cylinder 20. The door is shown raised from the jig 33 and resting on rollers 21.

The mode of operation is as follows, referring to Fig. 9: With switches X and Y closed, the motor M is energized by the magnetic contactor V, which remains closed by its self-energizing contact U. The motor revolves the rotor 3 at uniform speed through the reduction gears 1 and 2. The transformer 51 steps down the voltage for the timing control circuit, and with toggle switch Q closed, the gang spot welder is ready for the operation. After the door has been placed on the ejector rollers 21, the operator presses switch B which energizes solenoid 30 opening the Ross valve 31 to put air above the piston 32 which is connected to the ejector 19. This brings the ejector down to its proper level. The work, as for instance, the two panels of an automobile door, is fitted over the jig 33, shown in Fig. 4, which serves to hold the door in proper contact with the electrode pads 12. When the operator closes the push button C, the solenoid 39 is energized through the normally closed contact 36b of the timer 36, through lines 35, 37 and 38. The Ross valve 40 is closed by the solenoid 39, and this causes air to flow through pipe 41 to the right of the piston 42, and thereby straightens the toggle 18 to raise the work table 29. The door panel is pressed against the electrodes 11, compressing springs 11a. In raising the work table 29, the limit switch 43 is closed. This establishes a circuit through line 44, energizing the timer clutch solenoid 45, and through line 46, energizing the magnetic contactor solenoid 47. The solenoid 47 closes the primary switch 48 that supplies the primary current to rotor windings 8, through the feeders 48e and 48f, and through the brushes and slip rings 4 and 5.

When the solenoid 45 is energized, it engages the clutch C' to drive the timer mechanism 52 and closes 36a, maintaining the circuit across the push buttons B and C, and thus permits the operator to release the buttons.

When the clutch C' is thrown in, it causes the timing mechanism cam 52 to revolve for a period of time equivalent to the time required by the rotor 3 to revolve one-half revolution; then the point 54 of the cam opens the normally closed contact 36b, de-energizing the solenoid 47 of the primary switch 48, and at the same time de-energizing the timer solenoid 45. This causes the clutch to disengage the timing cam 52 from the drive pulleys, and opens switch 36a which breaks the circuit to the solenoid 39 of the Ross valve 40. This Ross valve is released and air flows through pipe 41a to the left of piston 42 pushing it towards the right lowering the toggle 18.

The table 29 drops and opens the limit switch 43 which breaks the circuit to the solenoid 30 of the Ross valve 31. This causes air to flow to the bottom of the piston 32 raising the ejector mechanism 19 to its starting position. The table 29 is cushioned by the springs 28. The springs 27 help to push the door from the electrodes when the press table 29 is lowered. The rotor is kept revolving without any load, that is with the primary de-energized, between welding operations, to help cool the windings 8, although it is possible to release the motor contactor after every welding operation.

Each secondary coil is connected to two cables and to two electrodes. When the press is closed, all the electrodes are short-circuited by the work. At any position of the rotor at least two coils are being energized and, therefore, current is passed through, at least, four electrodes. Therefore, to energize all the electrodes, the rotor must be rotated half a revolution.

Referring to Fig. 12: This shows a diagrammatic circuit of a gang spot welder comprising a press and a three-phase impulse generator. The three-phase rotor is shown in Fig. 11.

Figure 6:
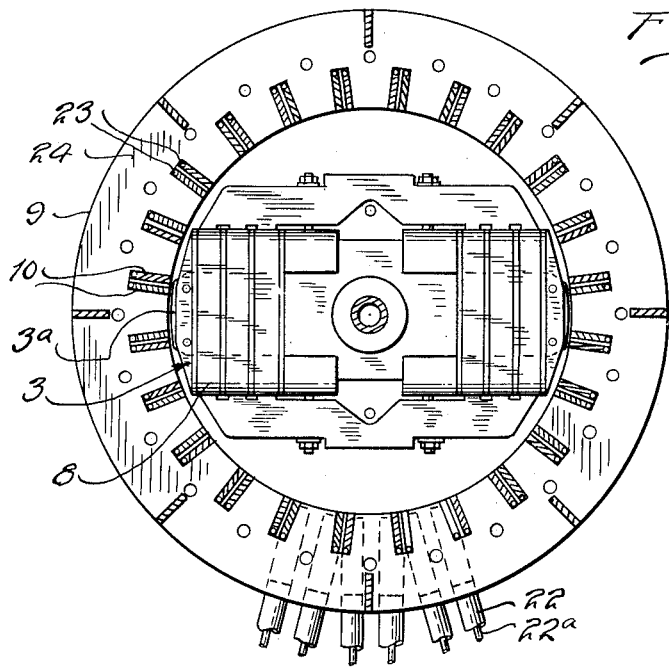
Fig. 6 is a section on the line 6—6 of Fig. 5.
Figure 11:
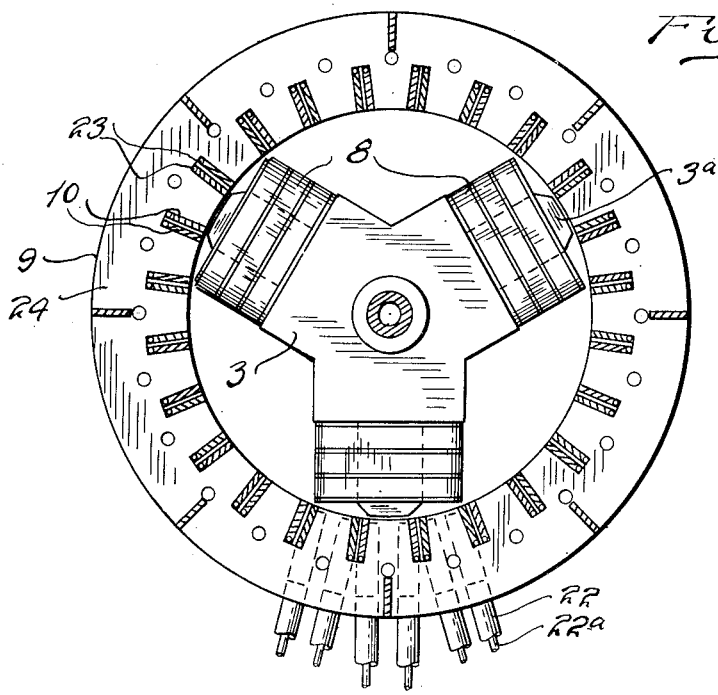
Fig. 11 is a horizontal section of the impulse generator showing a three-phase rotor, with the same stator as shown in Fig. 6.

Referring to Figs. 6 and 11: It is seen that the single-phase and three-phase impulse generators have identical stators. The single-phase impulse generator has a two-pole rotor in the form of an I, that is, 180 degrees apart. The three-phase rotor has three poles spread in the form of a Y, that is, 120 degrees apart. The windings of a single-phase impulse generator are connected in series parallel across the single phase supply. The windings of a three-phase impulse generator may be connected either in Y or delta.

Referring to Fig. 12: The three-phase rotor 3 is equipped with three sets of slip rings and brushes; three primary feeder cables connect the rotor to the three phase supply through a three-pole magnetic contactor 48. The timing operation is identical to that of the single-phase impulse generator. The diagram shows the position of the electrical contacts when the press is released, and the rotor is stationary.

The primary rotor and secondary stator may be treated as a transformer. When the rotor face is opposite the tooth, the magnetic flux generated by the primary passes from the rotor core to the tooth through the air and divides into two parts which travel around the stator core to the opposite tooth, then again cross to the rotor face through the air, completing the magnetic circuit. This flux generates in the two coils facing the rotor an induced voltage of sufficient magnitude to generate a secondary current which courses through the cable to the electrode; then through the metal sheets to be welded and back through the second electrode, cable, and finally to the secondary coil. Therefore, the two electrodes are in series, and each secondary coil energizes two electrodes and produces two welds. The current induced in the secondary is an alternating current, and is of constant magnitude as long as the rotor is stationary. When the rotor is displaced from the stationary position, reducing the coupling between the primary and secondary coils, the secondary current of the two opposite coils diminishes. As the rotor is moved around, the relative coupling of two opposite coils is first low, then increases to maximum, and then again reduces to a minimum value. If the rotor were rotated further, the coupling would again increase to maximum, and then diminish; these cyclic changes occur at every 180 angular degrees of rotation of the rotor and produce a modulated secondary current. Since the flux from the rotor has a tendency to spread out at the gap between the rotor and stator, some flux is cut by the adjacent secondary coils, so that when the center coil has a maximum value, the coils to the left and right are also generating some current.

A three-phase impulse generator performs the welding operation more rapidly than a single-phase machine of the same number of secondary coils, for the three-phase rotor needs to turn only 120 degrees instead of 180 degrees to energize all the secondaries. The thermal capacity is greater for the primary coils are energized only two-thirds of the time required by a single-phase impulse generator. Although the momentary welding load is 50 per cent greater, the line current is lower, so that the voltage regulation of the system is better. The primary welder load upon the substation is balanced, and there are no circulating currents between phases. A heavy single-phase load taken from a three-phase bank of transformers causes unbalanced currents to flow through the system. A three-phase rotor eliminates this objection, as the primary line currents are balanced at all times during the welding operation.

We claim:

1. In a gang spot welder, the combination of a plurality of electrodes, means for causing all the electrodes to engage the work at one time and means for distributing successive impulses of energy to certain electrodes in succession, comprising a transformer having relatively rotatable members, the stationary member provided with a multiplicity of close spaced secondary circuits, each in the form of a long narrow axially extending loop connected with one electrode at each end of the loop and a member provided with a primary circuit arranged to be in successive inductive relation with the secondary circuits as one member is rotated with respect to the other member.

2. In a gang spot welder, the combination of a plurality of electrodes, means for causing all the electrodes to engage the work at one time and means for distributing successive impulses of energy to certain electrodes in succession, comprising a transformer having relatively rotatable members, the stationary member provided with a large number of closely spaced secondary circuits each circuit a long narrow loop of heavy section conducting material and provided with an opening and fluid cooled, and a rotatable member provided with a primary circuit of a large number of turns arranged to be in successive inductive relation with the secondary circuits as one member is rotated with respect to the other member.

3. In a gang spot welder, the combination of a plurality of spot welding electrodes, means for causing all the electrodes to engage the work at one time and means for distributing successive impulses of gradually built up and gradually diminished energy to certain electrodes in succession, comprising a transformer having relatively rotatable members, one member provided with secondary circuits connected with the electrodes and a member provided with a core provided with a primary circuit winding arranged to be in successive inductive relation with the secondary circuits as one member is rotated with respect to the other.

4. In a gang spot welder, the combination of a plurality of electrodes, means for causing all the electrodes to engage the work at one time and means for distributing successive impulses of energy to certain electrodes in succession, comprising a transformer having relatively rotatable members, the stator provided with a continuous ring-like core having a large number of axially extending slots arranged closely around the interior surface of the ring-like core, said slots forming stator core teeth, secondary circuits connected with the electrodes and the secondary circuits comprising a multiplicity of single loops one enclosing each stator tooth and two legs of adjoining loops lying insulated in each slot and a rotor having a metal core with a primary winding of a large number of turns located at the extreme end of the core and arranged to be brought into successive inductive relation with the secondary circuits as one member is rotated with respect to the other member.

5. In a gang spot welder, the combination of a plurality of electrodes, means for causing all the electrodes to engage the work at one time and means for distributing successive impulses of energy to certain electrodes in succession, comprising a transformer having relatively rotatable members, a stationary member provided with a large number of independent secondary circuits in the form of closely packed axially extending loops of heavy bar stock and connected with the electrodes and embedded in the inside surface of a closed or a ring-like core and the other a rotary member arranged on the inside of said secondary circuits and a continuous core provided with a primary circuit of a large number of turns arranged to be in successive inductive relation with the secondary circuits as one member is rotated with respect to the other.

6. In a gang spot welder, the combination of a plurality of electrodes, means for causing all the electrodes to engage the work at one time and means for distributing successive impulses of energy to certain electrodes in succession, comprising a transformer having relatively rotatble members, one member provided with secondary circuits connected with the electrodes and embedded in a closed or a ring-like core of laminated strips and a member arranged on the inside of said secondary circuits and a core provided with a primary circuit arranged to be in successive inductive relation with the secondary circuits as one member is rotated with respect to the other.

7. In a gang spot welder, a multiplicity of electrodes arranged to engage the work at one and the same time and means for distributing successive shots of current to successive electrodes without arcing, comprising an impulse generator having a stator with a plurality of secondary circuits connected with said electrodes and provided with a rotor having three poles, and primary windings in circuit with a three-phase current supply, each pole being arranged to be brought successively into inductive relation with individual secondary circuits and all the secondary circuits being energized by the rotor turning 120 degrees.

8. In a gang spot welder, the combination of a plurality of electrodes, means for causing the work to engage all the electrodes at one time, means for distributing successive impulses of electrical energy to certain electrodes in succession comprising a transformer having relatively rotatable members, one member provided with secondary circuits, each circuit connected with selected electrodes and a member provided with a primary circuit winding arranged to be brought into successive inductive relation with the secondary circuits as one member is caused to continuously rotate with respect to the other and an electric timing mechanism including a switch for energizing the primary circuit only after the electrodes have been brought upon the work and then only during the completion of that number of degrees of rotation which will have delivered a single shot of energy to each set of electrodes.

9. In a gang spot welder, the combination of a plurality of electrodes, means for causing the work to engage all the electrodes at one time, means for distributing successive impulses of electrical energy to certain electrodes in succession comprising a transformer having relatively rotatable members, one member provided with secondary circuits, each circuit connected with selected electrodes and a member provided with a primary circuit winding arranged to be brought into successive inductive relation with the secondary circuits as one member is caused to continuously rotate with respect to the other and an electric timing mechanism including a switch for energizing the primary circuit only after the electrodes have been brought upon the work and then only during the completion of that number of degrees of rotation which will have delivered a single shot of energy to each set of electrodes, said timing mechanism comprising mechanism which is geared to the rotating member but which has a disconnectable connection and arranged so that when the connection is had for driving the timing switch member will be given a complete revolution to disconnect the primary current after a given part revolution of the rotating transformer member and the current will be permanently discontinued until the next welding operation.

10. In a gang spot welder, the combination of a plurality of electrodes, means for causing the work to engage all the electrodes at one time, means for distributing successive impulses of electrical energy to certain electrodes in succession comprising a transformer having relatively rotatable members, one member provided with secondary circuits, each circuit connected with selected electrodes and a member provided with a primary circuit winding arranged to be brought into successive inductive relation with the secondary circuits as one member is caused to continuously rotate with respect to the other and an electric timing mechanism including a switch for energizing the primary circuit only after the electrodes have been brought upon the work and then only during the completion of that number of degrees of rotation which will have delivered a single shot of energy to each set of electrodes, the said timing mechanism including a timing member and a clutch connection with the rotating transformer part with the gear ratio such as to rotate the timing member one complete turn to discontinue the primary current when the rotor has rotated part of a turn so as to have brought all the secondaries into inductive relation with the primary circuit.

11. In a gang spot welder, the combination of a plurality of electrodes, means for causing the work to engage all the electrodes at one time, means for distributing successive impulses of electrical energy to certain electrodes in succession comprising a transformer having relatively rotatable members, one member provided with secondary circuits, each circuit connected with selected electrodes and a member provided with a primary circuit winding arranged to be brought into successive inductive relation with the secondary circuits as one member is caused to continuously rotate with respect to the other, an electric timing mechanism including a switch for energizing the primary circuit only after the electrodes have been brought upon the work and then only during the completion of that number of degrees of rotation which will have delivered a single shot of energy to each set of electrodes and a control mechanism including a timing mechanism and which when energized brings the work into engagement with all the electrodes and then engages a clutch connection between the timing mechanism and the rotating member of the transformer to close the switch in the primary circuit and allow the same to be closed for a given time sufficient for the rotor to have brought the primary into inductive relation with all the secondary circuits.

12. In a gang spot welder, the combination of a plurality of electrodes, means for causing the work to engage all the electrodes at one time, means for distributing successive impulses of electrical energy to certain electrodes in succession comprising a transformer having relatively rotatable members, one member provided with secondary circuits, each circuit connected with selected electrodes and a member provided with a primary circuit winding arranged to be brought into successive inductive relation with the secondary circuits as one member is caused to continuously rotate with respect to the other, an electric timing mechanism including a switch for energizing the primary circuit only after the electrodes have been brought upon the work and then only during the completion of that number of degrees of rotation which will have delivered a single shot of energy to each set of electrodes, a control mechanism including a timing mechanism and which when energized brings the work into engagement with all the electrodes and then engages a clutch connection between the timing mechanism and the rotating member of the transformer to close the switch in the primary circuit and allow the same to be closed for a given time sufficient for the rotor to have brought the primary into inductive relation with all the secondary circuits thereupon causing the work to be withdrawn from the electrodes and an ejector mechanism for ejecting the work and tripped by the movement of the work away from the electrodes.

FRANCIS G. DA ROZA.
ROBERT SCHIFF.